UNITED STATES PATENT OFFICE 2,005,511

BASIC DERIVATIVES OF PORPHINS AND METALLOPORPHINS AND PROCESS FOR THEIR MANUFACTURE

Arthur Stoll and Erwin Wiedemann, Basel, Switzerland, assignors to Chemical Works formerly Sandoz, Basel, Switzerland No Drawing. Application December 15, 1932, Serial No. 647,490. In Switzerland December 22, 1931

6 Claims. (Cl. 260—46)

The present process relates to the manufacture of new strongly basic porphins and their metallo-compounds.

By the general name "Porphins" there are meant the dyestuffs contained in the blood or leaves of plants. These dyestuffs possess in their molecule a heterocyclic ring of 12-carbon and 4-nitrogen atoms and can easily be characterized by their absorption-spectra.

It has now been found that new basic porphins can be prepared by treating porphins with compounds of the general formula:

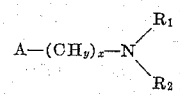

wherein A represents a primary, secondary or tertiary alcoholic or enolic hydroxylic or an amido or a mono-substituted amido group, $(CH_y)_x$ represents a saturated or unsaturated aliphatic continuous or branched carbon-chain, and $R_1$ and $R_2$ represent hydrogen, alkyl, alkoxy, alkylamino, halogenalkyl, aryl, aralkyl, or amido groups, and may represent identical or different groups or belong to a heterocyclic ring, whereby basic side-chains become introduced into the porphin molecule.

The compounds thus obtained possess much stronger basic properties than the porphins hitherto known and yield with strong mineral acids salts which are soluble in water to neutral solutions.

For the introduction of the basic side-chains into the porphin molecule the form in which the porphin is used as starting material is immaterial. It can be employed in hydrogenated or oxidized form or as a metal compound, whereby the latter may also be used in form of an alcoholate, base or salt.

The treatment with the basic compounds can be carried out in the usual way at low or higher temperature and in presence or absence of solvents or catalysers.

The present process allows the preparation of compounds of a quite new class, that possess besides the properties of the natural porphins, a strong basic nature. Nearly all the new compounds have in form of their salts the characteristic property of being soluble in water to a neutral solution, which aqueous solution shows the neutral spectrum of the porphins, that until now has never been observed.

The following examples illustrate the present process, the parts being by weight:

Example 1

One part of methylphaeophorbid is heated to 70° C. with about 3 parts of asymmetrical N-diethyl-ethylene-diamine, until a test, when diluted with chloroform-ether and shaken with a 1% hydrochloric acid solution shows that the dyestuff has completely passed in the acid solution. Is this point reached, the reaction mixture is treated with a chloroform-ether mixture and the dyestuff is isolated by means of a hydrochloric acid solution. By concentrating the aqueous acid solution, the new product precipitates in form of small crystals. The free base is in the dry state a dark green powder, crystallized in form of prismatic needles. It is difficultly soluble in ether, but soluble in water in form of its salts of strong acids. Its aqueous solutions are neutral and show the neutral spectrum. The product obtained by this example has the following structural formula:

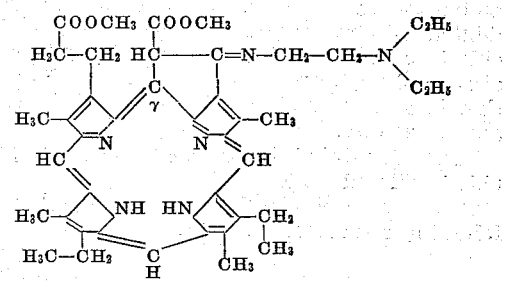

Example 2

One part of methylphaeophorbid is heated with about 3 parts of diethylaminoethanol to 100–130° C. After cooling down the reaction mixture becomes hard; it is then treated with chloroform and about 2000 parts of ether. The etheric solution is shaken with water in order to separate the excess of diethylaminoethanol and the dyestuff is extracted from the etheric solution by treating same with 300 parts of a 0,1% aqueous hydrochloric acid solution. The new product can then be isolated in pure form in the usual way.

The new base is a dark green dyestuff, difficultly soluble in ether and methanol. Its salts of strong acids are soluble in water to a neutral solution and show the neutral spectrum.

The product obtained by this example has the following structural formula:

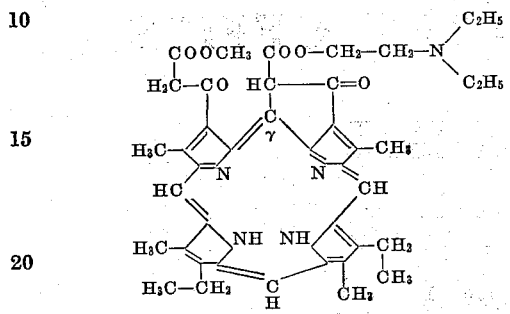

Example 3

One part of methylphaeophorbid and 4 parts of ethylenediamine are heated up to 100° C., and the reaction product is diluted with ethyl acetate. The basic porphin can then be isolated from this solution by extraction with hydrochloric acid. In the form of free base it is a dark blue green dyestuff, difficultly soluble in ether. Its salts of strong acids are soluble in water to a neutral solution, showing a neutral spectrum.

The product obtained by this example has the following structural formula:

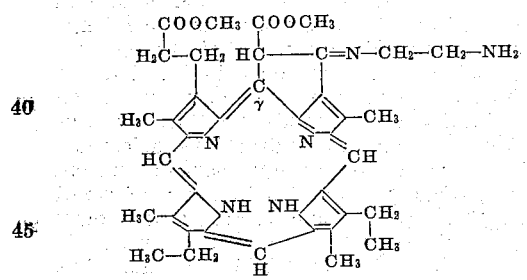

Example 4

One part of phaeophorbid is heated with 3 parts of asymmetrical diethylaminoethylenediamine to about 100° C., the reaction product is diluted with water and neutralized with hydrochloric acid. By shaking this solution with ethyl acetate, the dyestuff becomes completely dissolved therein and can be isolated from this solution in any usual way.

In the dry state it is a dark-green dyestuff, soluble in diluted acids.

The product obtained by this example has the following structural formula:

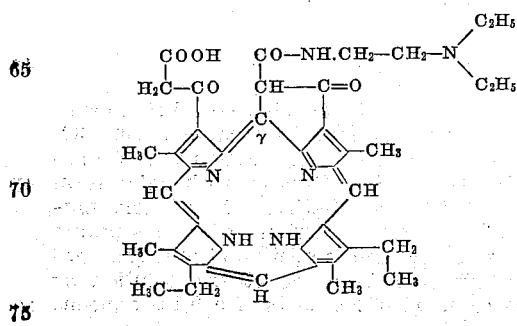

Example 5

One part of protoporphyrin-dimethylester and 3 parts of diethylaminoethylenediamine are heated in a closed vessel to 150° C., whereby the new basic product is formed. It can be isolated by extracting it from its solution in a mixture of chloroform and ether by means of diluted hydrochloric acid. As free base it constitutes a dark red-brown dyestuff.

The product obtained by this example has the following structural formula:

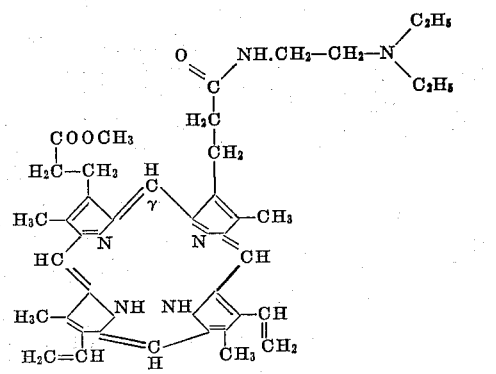

Example 6

One part of haematoporphyrin is heated to 150° C. with 5 parts of diethylaminoethanol, the reaction product is dissolved in ether and extracted therefrom with hydrochloric acid. The hydrochloride of the new base crystallizes out from its aqueous solution in form of small hygroscopic plates. By dissolving the base in methanol, the methylester of haematoporphyrin is easily obtained.

It is also possible to introduce a metal radical into the molecule by treating the aqueous solution of salts of the base with suitable metal compounds.

The product obtained by this example has the following structural formula:

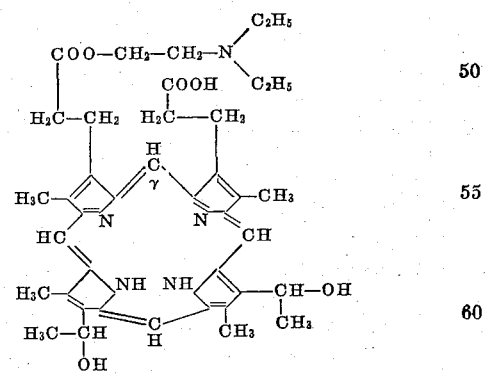

Example 7

One part of phylloporphyrin is heated to 155° C. with 5 parts of diethylaminoethanol, whereby the new basic product is formed. It crystallizes out from the reaction mixture in form of big prismatic needles and can be recrystallized from a mixture of chloroform and diethylaminoethanol, yielding a product of F. P. 210° C.

The new product is a dark red-brown dyestuff; its salts of strong acids are easily soluble in water to a neutral solution.

The product obtained by this example has the following structural formula:

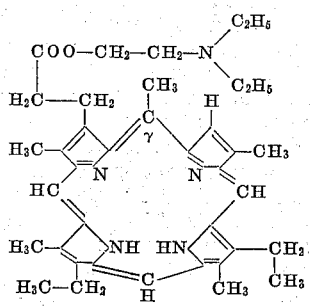

Example 8

If phylloporphyrin used in Example 7 is replaced by pyrroporphyrin, a new basic compound of F. P. 188° C., is obtained, which crystallizes out in form of prismatic needles and is soluble in water to a neutral solution in form of its salts.

The product obtained by this example has the following structural formula:

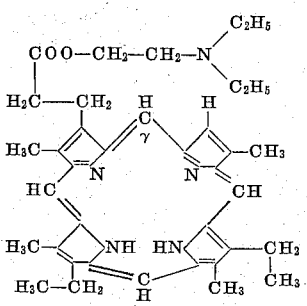

Example 9

One part of phylloporphyrin-methylester is heated in a closed vessel to 180° C. with 5 parts of diethylaminoethylenediamine and the reaction product is treated with chloroform, filtered and after addition of methanol concentrated, until chloroform is separated. The new product crystallizes out from the methanol solution in form of prismatic needles of F. P. 235° C.

It is a dark red-brown dyestuff, possessing basic properties. Its salts of strong mineral acids are soluble in water to a neutral solution showing the neutral spectrum.

The product obtained by this example has the following structural formula:

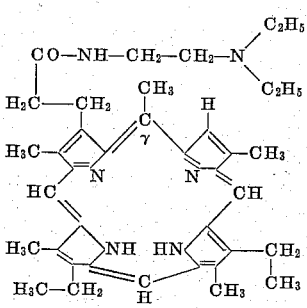

Example 10

By replacing in the preceding example phylloporphyrin-methylester by pyrroporphyrin-methylester, a similar dark red-brown compound of F. P. 211° C. is obtained.

The product obtained by this example has the following structural formula:

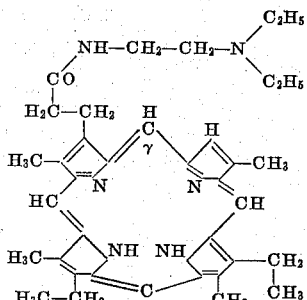

Example 11

One part of the copper salt of methylphaeophorbid is heated to 100° C. with 3 parts of diethylaminoethylenediamine and the reaction product obtained is diluted with chloroform and ether. The new strong basic porphin is extracted from this solution by means of hydrochloric acid or in any other usual way.

The new base is a dark blue-green dyestuff soluble in organic solvents with a blue-green coloration. Its salts of strong acids are soluble in water to a blue-green solution.

By using in this example the asymmetrical diethylaminoethylenediamine, a similar product is obtained.

The product obtained by this example has the following structural formula:

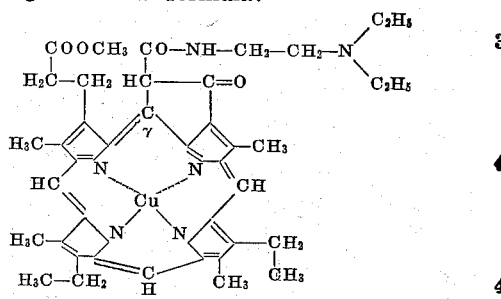

Example 12

One part of the iron salt of phylloporphyrin ester is heated to 160–170° C. with 5 parts of diethylaminoethanol and the reaction product is treated as above described. The new base crystallizes out in form of prismatic needles from a mixture of chloroform and ether and is a dark-brown dyestuff possessing basic properties.

The product obtained by this example has the following structural formula:

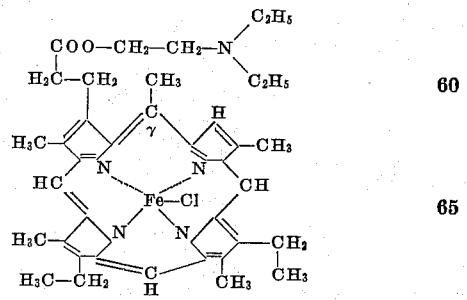

Example 13

5 parts of phaeophytin are heated under stirring to 140–150° C. with 25 parts of triethanolamine for 2-3 hours; then one part of copper-acetate is added to the reaction mixture and the heating is continued for a short time. To the product thus obtained there are then added while well stirring 200 parts of water, whereby the phaeophytin-copper salt that did not enter into reaction becomes precipitated. The obtained mass is filtered, the filtrate concentrated to about half its volume and the new product is precipitated therefrom by means of common salt and a small quantity of diluted hydrochloric acid.

The product thus obtained is soluble in water to neutral green solutions.

The product obtained by this example has the following structural formula:

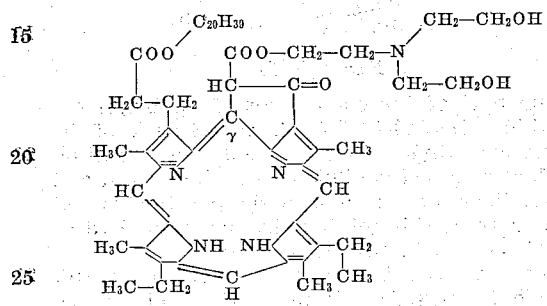

Example 14

A mixture consisting of one part of chlorine e and 5 parts of diethylaminoethanol is heated to 155° C., suspended in ether and the etheric solution is treated with a sodium carbonate solution in order to extract the unreacted part. The new product is then extracted from the etheric solution by means of diluted hydrochloric acid or in any other usual way.

Instead of chlorine e, rhodine g may be used. With respect to the meaning of chlorine e and rhodine g, attention is directed to "Untersuchungen über Chlorophyll: R. Willstätter und A. Stoll, Berlin 1913, edition Springer, page 290, where it is said that phytochlorine e and phytorhodine g are the most important products of the hydrolyse of phaeophytin and other phaeophorbids. As these split products do not simply result by saponification of the two ester groups, but simultaneously by one of several possible transformations of the lactam groups, the reaction like the saponification of the chlorophyll is highly dependent of the conditions. According to the main object, to which the hydrolyse serves, the obtainment of the phytol or the isolation of the basic split products, different processes for the saponification of the phaeophytin come into consideration, which can be performed with alcoholic potassium lye cold and hot, but by no means with diluents, that is not by use of etheric phaeophytin solutions. In this case, instead of the stable phytochlorine e, the weaker basic unstable chlorine g, and instead of the phytorhodine g, the weakly basic phytorhodine k would result.

The product obtained by this example has the following structural formula:

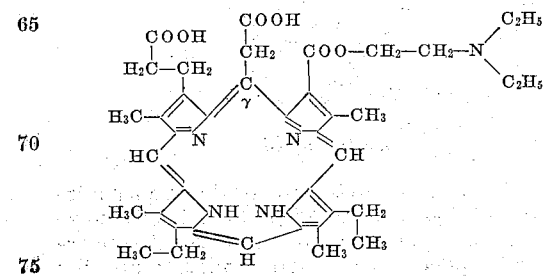

Example 15

One part of haemin (chlorhaemin of protoporhyrin) is heated with 5 parts of diethylaminoethanol to 155° C., the solution obtained is filtered, the filtrate is treated with chloroform and the new base is isolated from the chloroform solution in any usual way.

Instead of the above cited product the iron salt of tetramethylhaematoporphyrin can be used and transformed into the basic ester.

The product obtained by this example has the following structural formula:

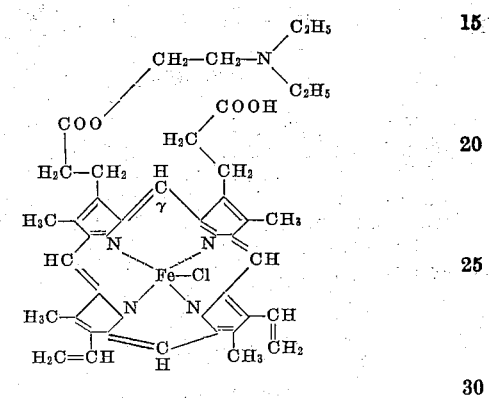

Example 16

One part of rhodoporphyrin-dimethylester is heated with 6 parts of asymmetrical N-diethylaminoethylenediamine to about 180° C. and the new basic product is isolated from the reaction mixture in the manner described above. The new diamine crystallizes out in form of prisms.

By using protoporphyrindimethylester, a diamine which is easily soluble in organic solvents may be prepared.

The product obtained by this example has the following structural formula:

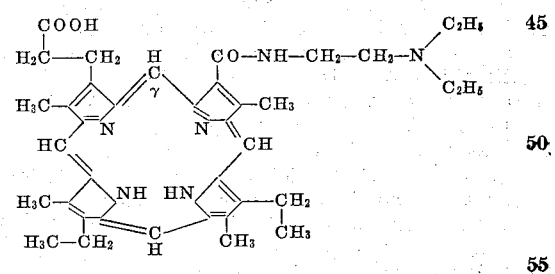

The examples given above illustrate the process for the preparation of the new basic porphins, whereby it must be pointed out that other amines than those cited above such as ethylenediamine, triethanolamine etc., may be used for the introduction of the basic side chains. The extraction of the basic bodies from the reaction product may be carried out in different ways, that is by extraction with organic solvents or with suitable acids, such as sulphuric acid, nitric acid, phosphoric acid, hydrobromic acid etc.

What we claim is:

1. A process for the manufacture of strong basic porphins, characterized in that porphins are heated with compounds of the general formula

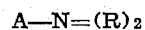

in which A represents ethylol or beta-aminoethyl and R represents hydrogen, ethyl or ethylol.

2. A process for the manufacture of strong basic porphins, characterized in that porphins are heated with compounds of the general formula $$A-N=(R)_2$$

in which A represents ethylol or beta-aminoethyl and R represents hydrogen, ethyl or ethylol, at a temperature of 70–180° C.

3. A process for the manufacture of strong basic porphins, characterized in that phaeophorbidae are heated with compounds of the general formula $$A-N=(R)_2$$

in which A represents ethylol or beta-aminoethyl and R represents hydrogen, ethyl or ethylol, at a temperature of 70–180° C.

4. A process for the manufacture of a strong basic porphin, characterized in that phaeophorbid is heated with diethylethylenediamine at a temperature of 100° C.

5. The strong basic porphins of the general formula $$X\beta-CH_2-CH_2-N(R)_2$$

wherein X represents a porphin molecule and $\beta$ means that the amine is linked to a $\beta$-carbon of the porphin molecule, and wherein R represents hydrogen, ethyl or ethylol, which compounds are in form of their free bases soluble in organic solvents with a red-brown, blue to green-blue coloration and that yield with strong acids water-soluble salts, yielding brown to green-blue neutral solutions, which aqueous solutions show the neutral spectrum of the porphins.

6. The diethylethylenediamine derivative of phaeophorbid, which is in dry state a dark-green compound, soluble in organic solvents with a green coloration and which yields with strong acids water-soluble salts, which aqueous solutions are neutral and show the neutral spectrum of the porphins.

ARTHUR STOLL.
ERWIN WIEDEMANN.